US012518900B2

(12) United States Patent
Maat et al.

(10) Patent No.: US 12,518,900 B2
(45) Date of Patent: Jan. 6, 2026

(54) ALUMINUM-CARBON NANOTUBE METAL MATRIX COMPOSITE MAGNET WIRES

(71) Applicant: YAZAKI CORPORATION, Tokyo (JP)

(72) Inventors: Stefan Maat, Camarillo, CA (US); Markus Boehm, Nuremberg (DE)

(73) Assignee: YAZAKI CORPORATION, Tokyo (JP)

( * ) Notice: Subject to any disclaimer, the term of this patent is extended or adjusted under 35 U.S.C. 154(b) by 311 days.

(21) Appl. No.: 18/309,095

(22) Filed: Apr. 28, 2023

(65) Prior Publication Data
US 2023/0268108 A1   Aug. 24, 2023

Related U.S. Application Data

(63) Continuation of application No. PCT/US2021/057397, filed on Oct. 29, 2021.

(60) Provisional application No. 63/107,997, filed on Oct. 30, 2020.

(51) Int. Cl.
*H01F 5/06* (2006.01)
*H02K 3/04* (2006.01)

(52) U.S. Cl.
CPC .............. *H01F 5/06* (2013.01); *H02K 3/04* (2013.01)

(58) Field of Classification Search
CPC ... H01F 5/06; H02K 3/04; H02K 3/30; H01B 1/023; H01B 7/02; H01B 3/30; H01B 7/0009; H01B 7/17
See application file for complete search history.

(56) References Cited

U.S. PATENT DOCUMENTS

| | | | |
|---|---|---|---|
| 2012/0267141 A1 | 10/2012 | Kamiyama et al. | |
| 2016/0336103 A1 | 11/2016 | Giezendanner-Thoben et al. | |
| 2017/0190579 A1 | 7/2017 | Cola et al. | |
| 2018/0233247 A1* | 8/2018 | Uchida | H01B 1/023 |
| 2019/0148037 A1* | 5/2019 | Leach | H02K 3/22 |
| | | | 174/120 R |

FOREIGN PATENT DOCUMENTS

| | | |
|---|---|---|
| JP | 6127007 A | 2/1986 |
| JP | 2011171291 A | 9/2011 |
| JP | 201939024 A | 3/2019 |

(Continued)

OTHER PUBLICATIONS

United States Patent and Trademark Office (USPTO), International Search Report and Written Opinion, PCT/US2021/057397, Jan. 28, 2022.

(Continued)

*Primary Examiner* — Christopher M Koehler
*Assistant Examiner* — Viswanathan Subramanian
(74) *Attorney, Agent, or Firm* — Perkins Coie LLP; Viola Kung; Alberto Araiza (57) ABSTRACT

A magnet wire including a conductive core of aluminum and carbon (e.g., carbon nanotubes). The magnet wire also includes an insulating layer on a surface of the conductive core. The insulating layer and the conductive core collectively form a fully insulated wire of a coil associated with a magnet. The magnet wire is configured to form, for example, the coil of the magnet for any of an electrical motor, an electrical generator, a transformer, an inductor, or a speaker.

17 Claims, 7 Drawing Sheets

(56) References Cited

FOREIGN PATENT DOCUMENTS

| | | | |
|---|---|---|---|
| WO | 2019094597 | A1 | 5/2019 |
| WO | 2019161041 | A1 | 8/2019 |
| WO | 2020160066 | A1 | 8/2020 |
| WO | 2020247669 | A1 | 12/2020 |

OTHER PUBLICATIONS

European Patent Office (EPO), Extended European Search Report, EPO No. 21887654.8, Sep. 11, 2024.

\* cited by examiner

*FIG. 1A (Wire-Wound)*

*FIG. 1B (Foil-Wound)*

ALUMINUM-CARBON NANOTUBE METAL MATRIX COMPOSITE MAGNET WIRES

CROSS REFERENCE TO RELATED APPLICATIONS

This application is a continuation of International PCT Application No. PCT/US2021/057397, filed Oct. 29, 2021, entitled "Aluminum-Carbon Metal Matrix Composite Magnet Wires", which claims the benefit of U.S. Provisional Application No. 63/107,997, filed Oct. 30, 2020, entitled "Aluminum-Carbon Metal Matrix Composite Magnet Wires". The aforementioned applications are incorporated herein by reference in their entirety.

TECHNICAL FIELD

The disclosed teachings relate to metal composites for magnet wires.

BACKGROUND

Magnet wire is a conductive wire coated with a thin layer of insulation. In some examples, magnet wire, is used in the construction of transformers, inductors, motors, generators, speakers, hard disk head actuators, electromagnets, and other applications that require tight coils of insulated wire. The insulation is typically made of a tough polymer, sometimes also referred to as the enamel.

Common materials for magnet wire applications include unalloyed pure metals, particularly copper (Cu). When factors such as chemical, physical, and mechanical property requirements are considered, Cu is the first-choice conductor for magnet wire. In one example, magnet wire is composed of fully annealed, electrolytically refined Cu that is closely wound to make electromagnetic coils. High-purity oxygen-free Cu grades are used for high-temperature applications in reducing atmospheres or in electrical machines (e.g., motors, generators) cooled by hydrogen gas. Aluminum (Al) magnet wire is sometimes used as an alternative for large transformers and motors. Because of its lower electrical conductivity, Al wire requires about 50 to 60% larger cross-sectional area than a Cu wire to achieve comparable resistance.

SUMMARY

The disclosed technology includes a magnet wire having a conductive core of aluminum and carbon. The magnet wire also includes an insulating mantle disposed on the conductive core. The insulating mantle and the conductive core are jointly configured to form a fully insulated wire of a coil of a magnet.

In one example, the carbon of the conductive core is less than 5 percent by weight (wt. %). In another example, the carbon of the conductive core is predominantly (e.g., more than 50%) in the form of carbon nanotubes.

In one example, the insulated wire can have a substantially round cross-section or a substantially rectangular cross-section. In another example, the insulated wire has a substantially two-dimensional cross section where substantially two-dimensional means that the width of the conductive core is substantially larger than its thickness (e.g., 10 or 1000 times larger).

In one example, the insulating mantle is formed of a polymer such as a polyester-amide-imide. In another example, the insulating mantle is formed of anodized aluminum.

The magnet wire can be configured to form a coil of a motor, a transformer, a generator, a speaker, an electromagnet, a magnetic actuator, or an inductor. The magnet wire can have properties such as a conductivity of at least 55% IACS (International Annealed Copper Standard), preferably about 60% IACS, an ultimate tensile strength of at least 200 MPa, and/or heat resistance that satisfies the AT4 specification of International Electrotechnical Commission (IEC) standard 62004 (IEC 62004).

BRIEF DESCRIPTION OF THE DRAWINGS

One or more embodiments of the present disclosure are illustrated by way of example and not limitation in the Figures of the accompanying drawings, in which like references indicate similar elements.

DETAILED DESCRIPTION

The embodiments set forth below represent necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying embodiments.

Magnet wire is used in induction coils for applications like transformers, motors, generators, speakers, electromagnets, and electromagnetic actuators. The coils may have either an air core or a magnetically permeable core including a material such as cobalt (Co), iron (Fe), nickel (Ni) or an alloy thereof such as but not limited to Co—Fe, Ni—Fe, Ni—Fe—Mo, Sendust (Fe—Al—Si), amorphous steel, silicon steel, or ferrite. The disclosed embodiments improve over magnet wire that is comprised of a metal conductor such as copper (Cu) or aluminum (Al) and a thin insulator coating (e.g., mantle, layer) that prevents electrical wire-to-wire shorting. The improved magnet wire also has a variety of uses, such as in induction coils in transformers, inductors, motor windings, generators, speakers, electromagnets, or electromagnetic actuators.

The disclosed embodiments improve over conventional magnet wire by substituting or modifying soft Al magnet wire or foil with stronger Al carbon nanotube (Al-CNT) composite magnet wire or foil with substantially the same conductivity, but higher tensile strength, higher heat resistance, and higher creep resistance. This approach allows for higher ampacities and tighter coil windings. Use cases of the disclosed magnet wire include electromagnets, transformers and motors for automotive and energy industries. As used herein, the term "substantially" can refer to a relative majority or preponderance.

While the exact cost of copper and Al fluctuates, Al is historically much less cost-prohibitive compared to Cu, which makes Al preferred for economic lightweight magnet applications. Moreover, Al exhibits a density of less than one-third that of Cu and has a conductivity of about 60% IACS (International Annealed Copper Standard). These properties further make Al attractive for the use as a conductor in electromagnets, particularly for lightweight applications. However, Al can be inherently soft and breaks under a tension exceeding about 70 to 100 MPa. The tensile strength of the conductor determines the tension and speed during coil winding and therefore coil winding tightness and efficiency of production. Higher strength Al alloys are available which would enable tighter winding; however, the conductivity of these alloys is markedly lower than that of Al. Moreover, Al has a low heat resistance and therefore the coil currents need to be limited to values that avoid Joule heating to temperatures more than about 150° C. for an extended amount of time. A desired Al composite conductor exhibits a similar conductivity to pure Al, but at higher tensile strength, higher creep resistance, and higher heat resistance than pure Al.

Figure 1A:
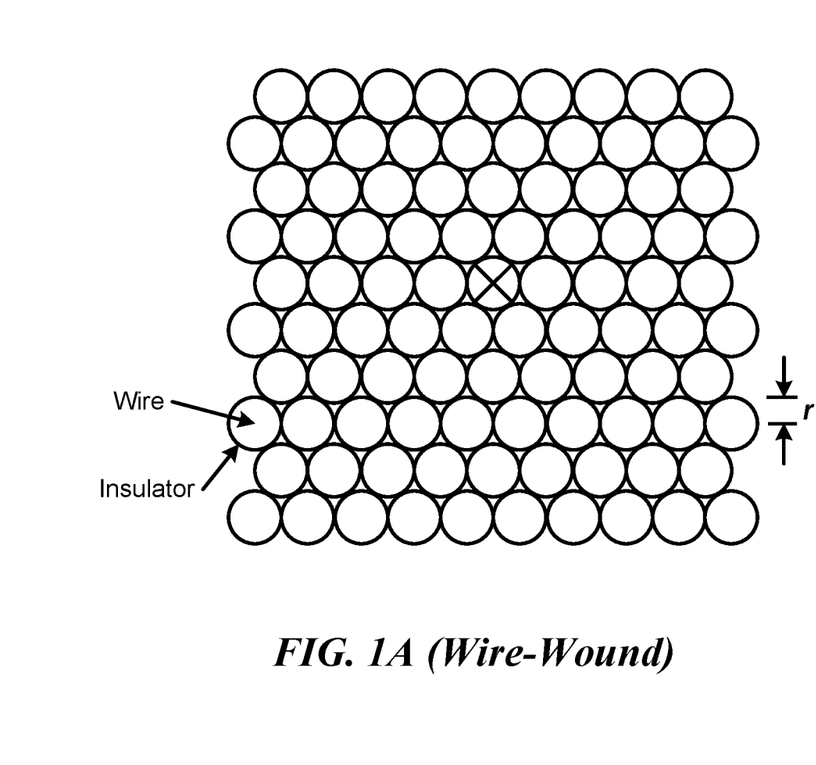
FIG. 1A illustrates a cross-section of a wire-wound coil of magnet wire.
Figure 1B:
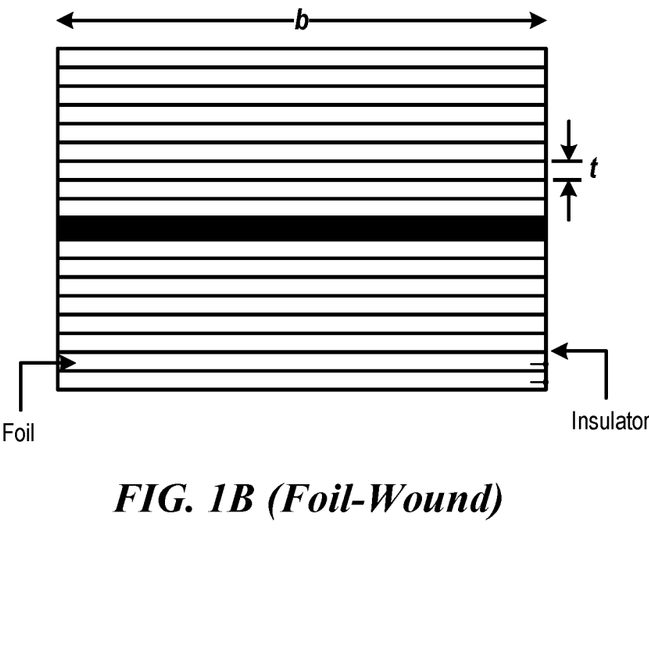
FIG. 1B illustrates a cross-section of a foil-wound coil of magnet wire.

FIGS. 1A and 1B illustrate different coil types. Specifically, FIG. 1A illustrates a cross-section of a wire-wound coil and FIG. 1B illustrates a cross-section of a foil-wound coil. As shown in FIG. 1A, wire wound coils have a substantially round conductive core of radius r with appropriate insulation. In other examples, wire wound coils have conductive cores that are substantially square, rectangular, or trapezoidal. As shown in FIG. 1B, foil wound coils have a substantially two-dimensional conductive core with appropriate insulation, where substantially two-dimensional refers to a width b of the conductive core that is substantially larger than its thickness t. For example, in one embodiment, the width of the conductive core is preferably between 10 and 1000 times larger than its thickness.

Copper coils comprise a conductive Cu, Nickel-plated copper (Ni/Cu), or Silver-plated copper (Ag/Cu) core and a thin insulating layer (e.g., enamel) on its surface comprised of a polymer to prevent wire-to-wire shorting. Aluminum coils comprise a conductive Al or Al alloy core and an insulating layer on its surface comprised of either a surface anodization or a thin insulating polymer (e.g., enamel) to prevent wire-to-wire shorting.

A filling factor, f, of a coil can be defined by the ratio of the conductor volume to a total volume of conductor, insulation, and any airgaps in between wires. It can readily be appreciated that coils comprising substantially rectangular or square wires will have a higher filling factor compared to coils comprising substantially circular wires. Similarly, foil wound coils generally will have a higher filling factor than wire wound coils.

Copper has a conductivity of about $5.87 \cdot 10^7$ S/m or 100% IACS and a density of 8.96 g/cm$^3$. Compared to copper, Al alloy 1350 has a lower conductivity of about $3.63 \cdot 10^7$ S/m or 61.8% IACS and a lower density of 2.70 g/cm$^3$. Inductance of a coil is a geometric property and therefore an Al coil of the same dimension as a copper coil will exhibit the same inductance but will be about 70% lighter. However, ampacity for the Al coil will generally be lower than for the copper coil due to the lower conductivity and heat resistance of Al compared to copper.

As used herein, ampacity can refer to the theoretical current carrying capacity of a wire of a given core, insulator material, and cross-section at ambient temperatures, i.e., the current at which it is safe to operate the wire for an extended amount of time. Often, ampacity of a wire is defined as a derated maximum allowable current, such as 90% of the current at which it is safe to operate the wire for an extended amount of time. However, it may be possible to operate a wire at currents higher than their ampacity for a short amount of time. Moreover, ampacity of a coil can also depend on the design of a coil, including but not limited to the geometry of the coil, filling factor, number of wire turns, core material, and cooling mechanism such as air or liquid cooling. For simplicity and illustration purposes of this disclosure, such details of design are omitted unless specified in the given examples.

Since the conductivity of Al 1350 (Al 1350) is lower than that of copper, the cross-section of Al magnet wire conductor needs to be at least 61.8% (e.g., ratio of 100% IACS of Cu to 61.8% IACS of Al 1350) larger compared to the cross section of copper magnet wire conductor to be operable at the same current. Accordingly, an Al magnet coil designed for the same current tends to be about at least 50-60% larger compared to a copper magnet coil. However, even at the increased size, the weight of the Al conductor will only be about 50% of the copper conductor due to the lower density of Al compared to copper. The foregoing simple estimation omits temperature effects due to Joule heating, heat conduction, heat convection, and heat radiation, some of which are taken into consideration in the examples discussed further below.

The insulating material of magnet wire is selected to withstand the maximum operating temperature of the coil. Table 1 summarizes temperature limits of various insulators according to the ANSI/NEMA MW 1000 2018 standard. Only a few selected wire insulation materials exist that can withstand operating temperatures above 180° C. Polyester-amide-imide (PAI) magnet wire insulation is a two-part insulation consisting of a modified polyester basecoat with a superimposed amide-imide outer coating. PAI is thermally stable up to about 200° C., which is well above the temperature rating of other magnet wire insulators. It exhibits exceptional windability, heat shock resistance, and ability to withstand overloads. Moreover, the chemical resistance of PAI compared to most solvents and insulating varnishes is extremely effective. For at least these reasons, PAI is a widely used magnet wire insulation material for motors and transformers.

TABLE 1

Types of magnet wire insulations and their specifications

| Thermal Class | Insulation Type | NEMA Standard (MW1000) | Federal Specification (JW1177) | Insulation Characteristics |
|---|---|---|---|---|
| 105C | Plain Enamel | NONE | NONE | Plain Enamel, known as oleoresinous enamel, was one of the first film insulations developed more than 75 years ago and is still in use today in a variety of electronic components. Plain Enamel wires are manufactured to single-build dimensional standards. Available in 40-44 AWG. |
| | Formvar | MW 15 (RD), MW 18 (SQ/RECT) | JW1177/4 (RD), JW1177/16 (SQ/RECT) | Formvar Enamel is made from vinyl acetal resins produced as a smooth uniform film. Formvar has excellent mechanical properties such as abrasion resistance and flexibility. |
| | Polyurethane Bondable | MW 3 | JW1177/44 | Bondable magnet wire is insulated copper wire with a superimposed film of thermoplastic bonding material. The bonding material is activated by heat or a solvent making it possible to wind coils in tight and unusual shapes since the wire may be bonded turn-to-turn as it is being wound. |
| | Formvar Bondable | MW 19 | JW1177/6 | |
| | Polyurethane Nylon Bondable | MW 29 | JW1177/30 | |
| 155C | Polyurethane-155 | MW 79 | JW1177/41 | Polyurethane-155 is a 155° C. thermal class solder strippable insulation produced primarily 30 AWG and finer with quick soldering characteristics at 390° C.. |
| | Polyurethane Nylon-155 | MW 80 | JW1177/42 | Polyurethane Nylon-155 is similar to the 155° C. Polyurethane with an additional Nylon overcoat to improve the abrasion resistance and heat shock characteristics for coil and motor windings. |
| 180C | Polyurethane-180 | MW 82 | NONE | Polyurethane-180 combines the thermal properties of a class 180° C. insulation, while offering low temperature solderability at 390° C.. |
| | Polyurethane Nylon-180 | MW 83 | NONE | Polyurethane Nylon-180 offers excellent abrasion resistance for ferrite core coils and transformers, while exhibiting high temperature thermal stress and low temperature solderability at 430° C.. |
| | Polyester-imide | MW 30 | JW1177/12 | Polyester-imide magnet wire is insulated with a Class H modified polyester resin. It has excellent thermal endurance, solvent resistance and exhibits a low coefficient of friction to improve windability. |
| | Polyester Nylon | MW 76 | JW1177/38 | Polyester Nylon is a film insulation with a modified polyester basecoat and a nylon topcoat. Typical of a dual coat construction, advantage is taken of the high thermal properties of the polyester and the mechanical properties of the nylon. |
| | Solderable Polyester | MW 77 | JW1177/39 | Solderable Polyester magnet wire is an ester-imide insulated wire which solders at 470° C.. |
| | Solderable Polyester Nylon | MW 78 | JW1177/40 | Solderable Polyester-Nylon magnet wire is a two-part insulation system in which ester-imide basecoat is overcoated with nylon. This wire solders at 455° C.. |
| | Polyester-imide Bondable | NONE | NONE | Self-bonding polyester actually describes a number of possible constructions of polyester base insulation with a thermoplastic bond coat. The bond coat is heat or solvent activated. |
| | Polyester-amide-imide Bondable | NONE | NONE | |
| | Solderable Polyester Bondable | NONE | NONE | |

TABLE 1-continued

Types of magnet wire insulations and their specifications

| Thermal Class | Insulation Type | NEMA Standard (MW1000) | Federal Specification (JW1177) | Insulation Characteristics |
|---|---|---|---|---|
| 200C | Glass Fibers | MW 44 (RD), MW 43 (SQ/RECT) | JW1177/21 (RD) | Both glass and Dacron glass are a served filament on the magnet wire conductor. They are available as unvarnished or varnished with organic or silicone varnishes. The fibers may be served over bare conductor or over film constructions. The glass is a continuous filament glass yarn and the Dacron glass is a combination of glass and polyester fibers. Glass offers high resistance to overload burnout and Dacron offers excellent abrasion resistance and flexibility. |
| | Dacron Glass (DDG) | MW 45 (RD), MW 46 (SQ/RECT) | JW1177/20 (RD), JW1177/25 (SQ/RECT) | |
| | Polyester-200 | MW 74 | JW1177/43 | Polyester-200 is a modified THEIC-polyesterimide one-part system. It has high temperature thermal properties and good chemical resistance. |
| | Polyester-Amide-Imide | MW 35 (RD), MW 36 (SQ/RECT) | JW1177/14 (RD), JW1177/13 (SQ/RECT) | Polyester-amide-imide magnet wire is a two-part insulation consisting of a modified polyester basecoat with a superimposed amide-imide outer coating. The wire exhibits exceptional windability, heat shock resistance and ability to withstand overloads. Excellent chemical resistance to most solvents and insulating varnishes. |
| | Polytetrafluoro ethylene (Teflon) | NONE | NONE | Teflon has high heat resistance and excellent resistance to most solvents, acids and corrosive chemicals and a high dielectric constant. |
| 240C | Polyimide-ML | MW 16 (RD), MW 20 (SQ/RECT) | JW1177/15 (RD), JW1177/18 (SQ/RECT) | ML is a film insulation made of polyimide resins. It is a Class 240 C. thermal rated insulation with exceptional resistance to chemical solvents and burnout. The wire ability to withstand excessive overloads extends the use of the magnet wire in extreme conditions. MS is unaffected by prolonged exposure to varnish solvents. |

Wire insulation can inhibit heat conduction from the inside to the outside of the coil, which may lead to hot-spots inside the coil that may damage the coil. For that reason, a thin insulation with high thermal conductivity is preferred.

Aluminum conductors may also be anodized to form an insulating aluminum-oxide (Al—Ox) layer. Al-Ox is an effective insulator and is thermally stable to temperatures up to about 500° C. Anodized Al-oxide insulation has a thermal conductivity of 28 to 35 W/m·K and a thickness of a few micrometers, typically 3-10 μm compared to a high temperature polymer insulator such as PAI with a thermal conductivity of 0.26 to 0.54 W/m·K and a thickness on the order of tens of micrometers. Therefore, heat in an Al coil with thin Al-Ox insulation will conduct more easily from the inside to the outside of the coil compared to an Al coil with thick polymer insulation, allowing for higher operating temperatures and therefore a higher coil ampacity. Nevertheless, although anodized Al is thermally stable up to 500° C., Al has a low heat resistance and therefore Al coil operating temperatures should be limited to about 150° C. or less for an extended amount of time.

The disclosed Al-composite wire exhibits higher strength, higher creep resistance, and higher heat resistance than standard Al wire to combine the advantage of low density of Al with the capability to operate at higher currents (e.g., higher ampacity) and temperatures for a given wire cross-section. In one example, an aluminum carbon nanotube (Al-CNT) metal-matrix composite (MMC) magnet wire provides improved value compared to an Al magnet wire as it exhibits an electrical conductivity similar to that of Al, but also exhibits a higher tensile strength, heat resistance and creep resistance compared to Al magnet wire as outlined below. Table 2 summarizes properties of various types of Al magnet wire.

TABLE 2

Types and properties of aluminum magnet wire

| ALLOY | CHEMICAL COMPOSITION (%) | ULTIMATE TENSILE STRENGTH (PSI) | ELECTRICAL CONDUCTIVITY (% IACS, 68° F.) | ELECTRICAL RESISTIVITY (Ω/CMF) | DENSITY (LB/IN$^3$) | SPECIFIC GRAVITY | COEFFICIENT OF LINEAR EXPANSION ×10$^{-6}$ 68-212° F. | APPROX. MELTING POINT (° F.) |
|---|---|---|---|---|---|---|---|---|
| 1350(EC) | 99.5 Al min. | 13,000 | 61.8 | 17 | .098 | 2.7 | 23.8 | 1200 |
| 1100 | 0.12 Cu, 99 Al min. | 13,000 | 59 | 18 | .098 | 2.71 | 23.6 | 1195 |
| 1199 | 99.996 Al min. | 6,800 | 64.9 | 15 | .0975 | 2.7 | 23.6 | 1220 |
| 5056 | 0.12 Mn, 5 Mg, 0.12 Cr, bal. Al | 42,000 | 29 | 36 | .095 | 2.64 | 24.1 | 1060 |
| 6061 | 0.6 Si, 0.28 Cu, 1 Mg, 0.2 Cr, bal. Al | 17,000 | 47 | 22 | .098 | 2.7 | 23.6 | 1080 |

As shown in Table 2, high conductivity Al, such as Al 1350, exhibits a conductivity of 61.8% IACS. In comparison, Al-CNT wire with about 0.5 percent by weight (wt. %) CNT exhibits a conductivity of at least 55% IACS, and preferably about 60% IACS. Therefore, the conductivity of Al-CNT wire is about 97% that of Al 1350 wire. The thermal coefficient of resistance, describing the increase in resistance with temperature, is about the same at $4.29 \cdot 10^{-3}$ for both Al 1350 and Al-CNT 0.5 wt. %. Magnet wire needs to exhibit a certain mechanical strength to withstand the forces applied for wire drawing and coil winding. A higher tensile strength allows for higher manufacturing speed and for tighter wound coils. Al 1350 exhibits a tensile strength of only about 13 kpsi (90 MPa). In contrast, Al-alloys such as 5056 or 6061 exhibit a higher tensile strength than Al 1350, of 42 kpsi (290 MPa) and 17 kpsi (117 MPa), respectively. Al-alloys such as 5056 or 6061 are employed for tight wound Al coils, but exhibit a drastically lower conductivity than Al 1350, merely 29% and 47% IACS, respectively, which requires further increasing the size of the conductors for a given ampacity and, hence, the weight advantage over a copper coil is lost.

In comparison to the aforementioned materials, Al-CNT wire with about 0.5 wt. % CNT exhibits a tensile strength in excess of 29 kpsi (200 MPa) or even 43.5 kpsi (300 MPa), depending on the degree of cold work applied during wire drawing. The higher tensile strength of Al-CNT wire thus allows for tighter coil windings and higher manufacturing speeds compared to Al 1350 wire with the benefit of exhibiting an electrical conductivity of at least 55% IACS, and preferably about 60% IACS, which is about 97% that of the Al 1350 and about the same or slightly above that of Al 1100.

Magnet wire further needs to exhibit a threshold heat resistance. Operation at elevated temperature must not result in loss of mechanical strength which may result in catastrophic failure such as wire thinning leading to thermal runaway or wire breakage. Al-CNT wire with about 0.5 wt. % CNT exhibits an AT4 heat resistance specification according to the International Electrotechnical Commission (IEC) 62004 heat resistance standard. It loses less than 10% of its ultimate tensile strength (UTS) when annealed at 400° C. for one hour or at 310° C. for 400 hours, meaning it can continuously be operated at up to 230° C. for 40 years without significant loss of tensile strength. On the other hand, Al 1350 meets merely the AT1-level heat resistance specification of the IEC 62004 heat resistance standard, meaning that it can be operated at up to only 150° C. for 40 years without a significant loss of tensile strength.

Al-CNT 0.5 wt. % CNT wires may therefore run hotter than Al 1350 wires, providing a further increase in ampacity as long as the temperature is below the rated temperature of the insulation. Table 3 summarizes the temperature and time conditions used during annealing for the various AT specifications of the IEC62004 standard. After annealing at given conditions, 90% of the initial UTS needs to be retained to pass a particular AT specification.

TABLE 3

IEC 62004 Table 5.

| Duration h | Temperature ° C. | AT1 | AT2 | AT3 | AT4 |
|---|---|---|---|---|---|
| 1 | Temperature of heating | 230 | 230 | 280 | 400 |
|  | Tolerance in temperature | +5 −3 | +5 −3 | +5 −3 | +10 −6 |
| 400 | Temperature in heating | 180 | 180 | 240 | 310 |
|  | Tolerance of temperature | +10 −6 | +10 −6 | +10 −6 | +10 −6 |

Table 4 summarizes how various AT-specifications translate to continuous acceptable operating temperatures for 40 years and 400 hours.

TABLE 4

IEC 62004 Table 1.

| Type |  | AT1 | AT2 | AT3 | AT4 |
|---|---|---|---|---|---|
| Density at 20° C. | (g/cm$^3$) | 2.703 | 2.703 | 2.703 | 2.703 |
| Allowable continuous operating temperature (40 yrs) | (° C.) | 150 | 150 | 210 | 230 |
| Allowable operating temperature in 400 h | (° C.) | 180 | 180 | 240 | 310 |
| Coefficient of linear expansion × 10$^{-6}$ | (/° C.) | 23 | 23 | 23 | 23 |
| Constant-mass temperature coefficient of resistance at 20° C. | (/° C.) | 0.0040 | 0.0036 | 0.0040 | 0.0038 |

The power dissipated in a wire is proportional to the resistance of the conductor and the square of the current passed through the wire. Power dissipation results in an increase of wire temperature, sometimes also referred to as Joule heating or Ohmic heating and should be limited in order for the wire not to degrade either mechanically or electrically.

More specifically, for a wire with metal conductor radius $r_1$ and an insulator thickness $d=r_2-r_1$, i.e., an overall radius $r_2$, the temperature rise $\Delta T=T-T_0$ over ambient temperature $T_0$ on the metal conductor to wire insulator interface can be expressed as:

$$\Delta T = \frac{I^2 \rho}{2\pi^2 r_1^2}\left(\frac{\ln\left(\frac{r_2}{r_1}\right)}{k} + \frac{1}{h r_2}\right), \quad \text{Equation 1}$$

where I is the electrical current passed through the wire, $\rho$ is the electrical resistivity of the metal conductor, k is the thermal conductivity of the insulator, and h is the heat transfer coefficient to ambient. For a metal, $\rho$ will have a temperature dependence as follows:

$$\rho=\rho_0(1+\alpha\Delta T), \quad \text{Equation 2}$$

where $\rho_0$ is the resistivity at ambient temperature and $\alpha$ is the thermal coefficient of resistance of the metal conductor.

For a rectangular metal conductor with a width b and thickness t and insulator thickness d, the temperature rise $\Delta T=T-T_0$ over ambient temperature $T_0$ on the metal conductor to wire insulator interface can be expressed as:

$$\Delta T = \frac{I^2 \rho}{2bt(b+t)}\left(\frac{1}{h} + \frac{d}{k}\right). \quad \text{Equation 3}$$

The disclosed technology includes a composition for Al-based wires that exhibits a conductivity similar to that of pure Al wires (e.g., Al 1350 wires) but with the strength of Al alloy wires (e.g., Al 6061 wires), and has improved creep resistance relative to Al-based wires. For example, a small addition of carbon nanotubes (e.g., less than 2 wt. %, more preferably <1 wt. %) to an Al metal matrix provides increased wire tensile strength, higher heat-resistance, and higher creep resistance compared to pure Al without CNT, while maintaining a substantially similar conductivity, modulus of elasticity, and coefficients of thermal expansion and thermal resistance. While the tensile strength and creep-resistance of Al-CNT increase with increased CNT weight ratio in the composite, the electrical conductivity decreases. As such, a concentration between 0.1 wt. % and 2 wt. % CNT, more preferably 0.2 wt. % to 1.5 wt. % CNT, or even more preferably about 0.5 wt. % CNT can maintain an electrical conductivity of at least 55% IACS, and preferably about 60% IACS. In particular, an Al MMC wire with 0.5 wt. % CNT can exhibit a strength greater than 200 MPa or even 300 MPa while satisfying the AT4 specifications of the IEC 62004 heat resistance standard for overhead transmission lines (as summarized in Table 1) and can exhibit a conductivity close to that of Al 1350.

An Al-CNT wire can attain mechanical strengthening with work and dispersion hardening by successively reducing the cross-section of an extruded Al-CNT rod through a cold working process (such as but not limited to rolling, drawing, or a combination thereof) until a desired diameter for the rod is obtained. During the cold working process to achieve the desired diameter, the grain structure of the rod is refined, and CNT disperses more evenly in the wire.

The disclosed embodiments include an application of work and dispersion hardened Al-CNT magnet wire with a polymer insulator, an application of work and dispersion hardened Al-CNT magnet wire with an Al-Ox insulator, e.g., an anodized surface layer, an application of work and dispersion hardened Al-CNT foil with a polymeric insulator, an application of work and dispersion hardened Al-CNT foil with an Al-Ox insulator.

The following examples illustrate how an Al-CNT composite can overcome the drawbacks of conventional Al or Al-alloys used in wire or foil for electromagnet coils. In one example, replacing Al 1350 magnet wire with Al-CNT magnet wire will result in higher strength and higher ampacity. In another example, replacing anodized Al 1350 foil with anodized Al-CNT foil will result in higher strength and higher ampacity.

Figure 2:
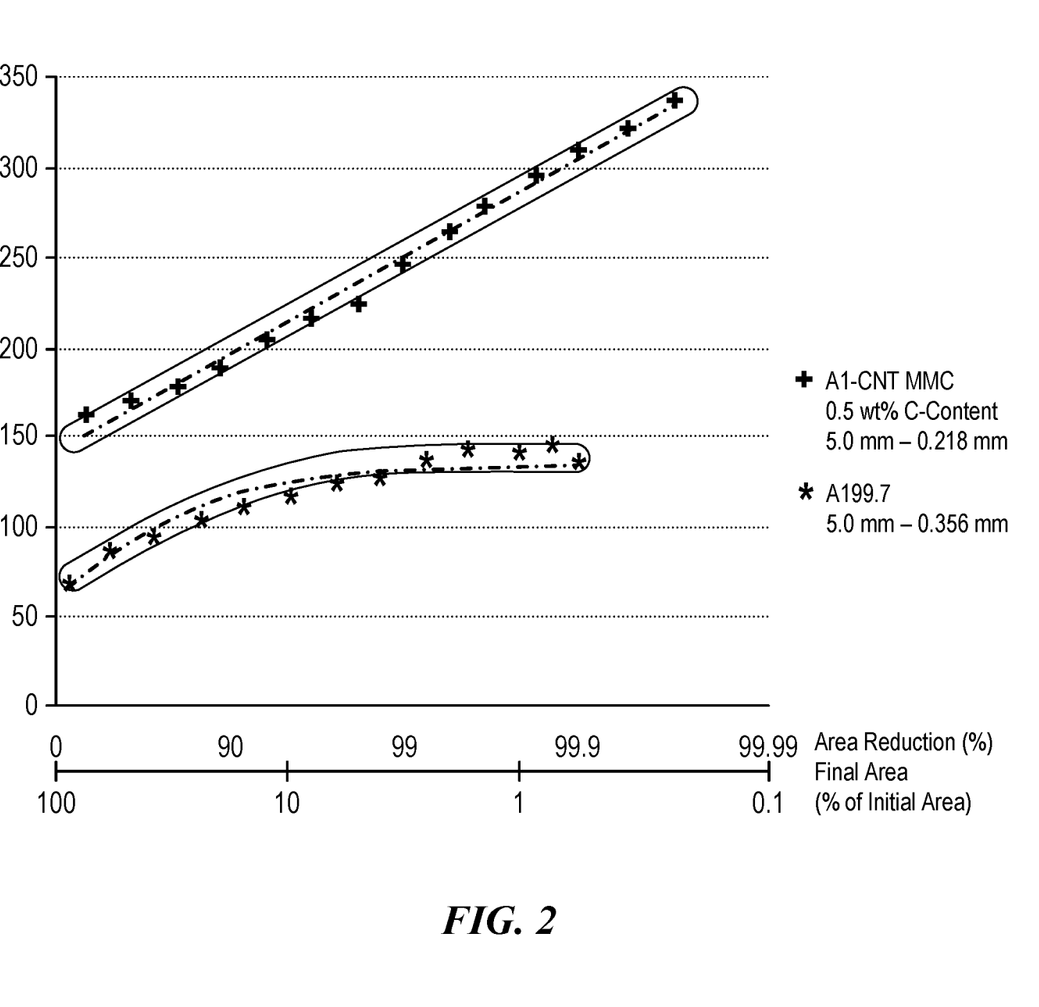
FIG. 2 is a graph that shows strengthening of aluminum (Al) and Al carbon nanotube (Al-CNT) rods with initial diameters by cold drawing to obtain desired diameters.

FIG. 2 is a graph that compares the strengthening of a 5 mm diameter extruded Al-CNT rod and a 5 mm diameter extruded Al (99.7%) rod upon reduction of wire size by successively applying cold drawing steps. The strengthening in the Al-CNT material is due to work and dispersion hardening, whereas strengthening of Al is due to work hardening alone. The CNT is already dispersed in an Al-CNT rod in an as-extruded condition. Thus, the initial strength of 145 MPa before drawing is already greater than the initial Al strength of 75 MPa. While the initial rates of strengthening with successive reduction in wire size by applying cold work are similar for Al-CNT and Al 99.7%, the rate of strengthening with successive reduction in wire size remains constant for Al-CNT while it decreases noticeably for Al 99.7%.

The initial extrusion diameter ($D_i$) of an Al-CNT rod for a desired ultimate tensile strength (UTS) and final diameter ($D_f$) of a wire can be calculated based on the following mathematical relationship:

$$D_i = D_f * \exp\left(\frac{UTS - A}{B}\right) \quad \text{Equation 4}$$

Here, A and B are constants that depend on an amount of CNT. For a matrix consisting of Al 99.7% combined with a 0.5 wt. % CNT concentration, A and B are about 145 and about 60, respectively.

A similar exponential relationship between the initial thickness ($t_i$) and final thickness ($t_f$) holds for a bar that is rolled down into a thin sheet or foil.

Figure 3:
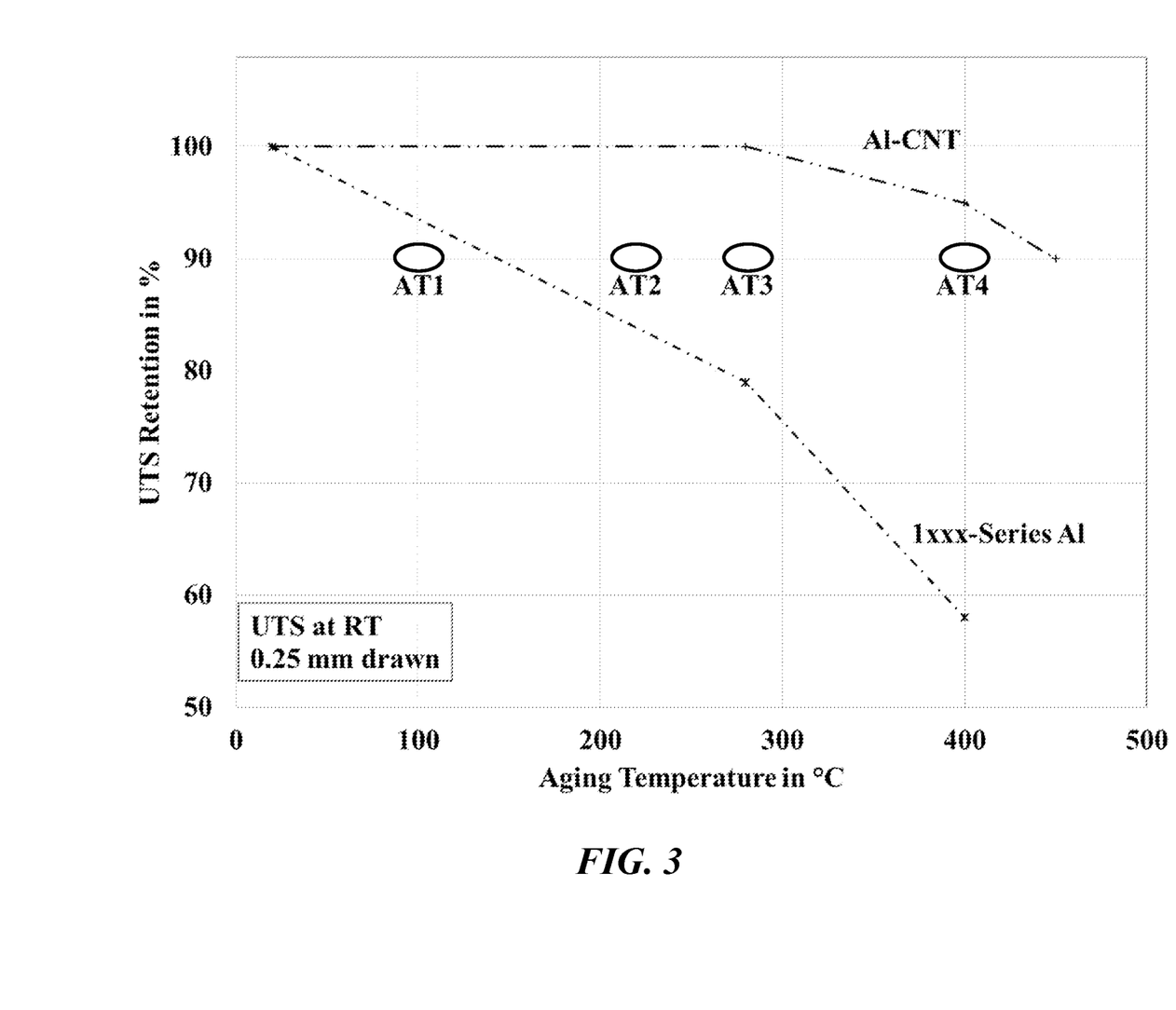
FIG. 3 is a graph that shows retention of ultimate tensile strength (UTS) after heating Al and Al-0.5 by weight percent (wt. %) CNT conductors at various temperatures.

FIG. 3 is a graph that shows retention of UTS after heating Al and Al-CNT wires at various temperatures. As shown, the Al-CNT wire satisfies the AT4 specification of the IEC 62004 standard, while Al or 1xxx series Al satisfies only the AT1 specifications of the IEC 62004 standard.

Figure 4:
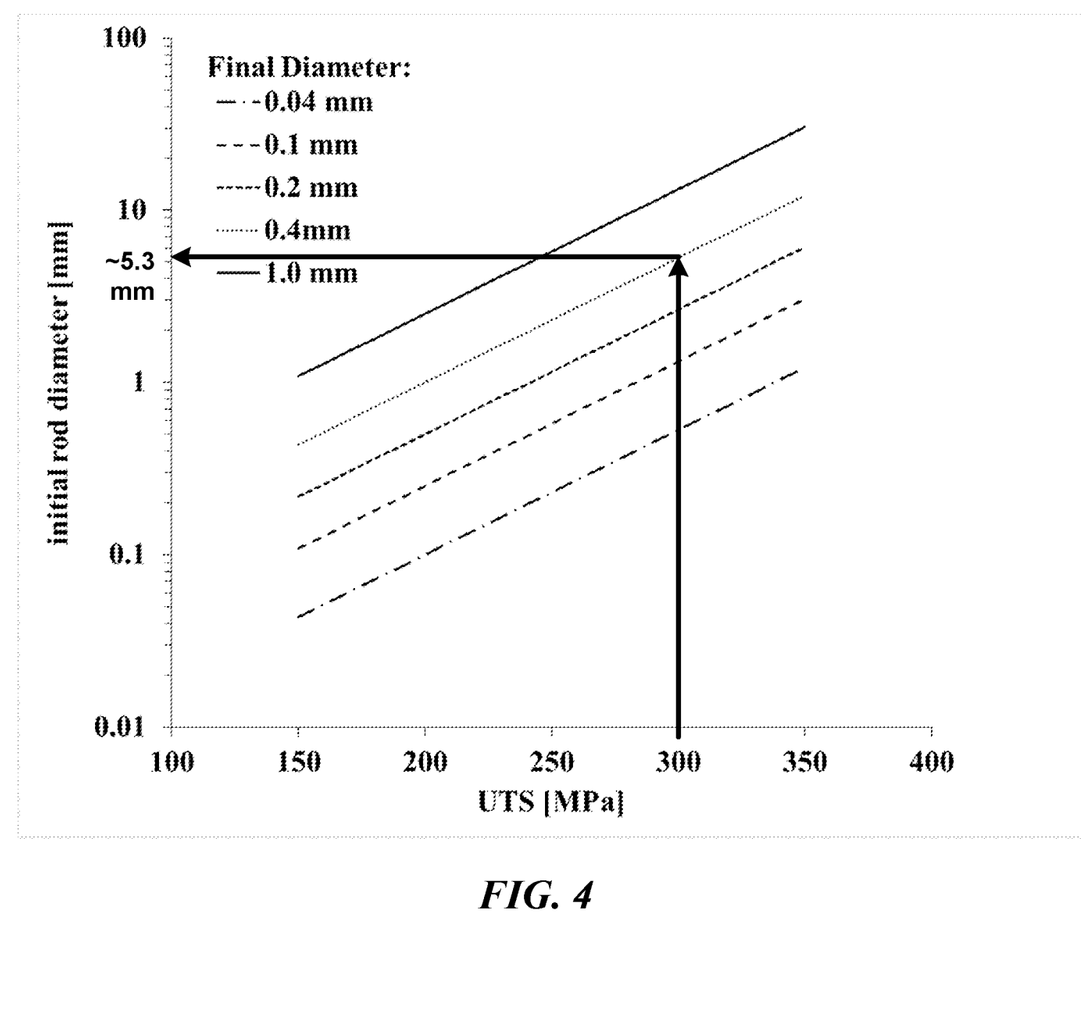
FIG. 4 is a graph that shows an initial rod diameter required for drawing the rod down to a wire with desired ultimate tensile strength and final wire diameter.

FIG. 4 is a graph that can be used to determine the initial rod diameter required in order to achieve a desired ultimate tensile strength by cold drawing to a selected final wire diameter. In the example provided in the Figure, in order to achieve a desired UTS of 300 MPa with a final wire diameter of 0.4 mm, the required initial rod diameter is about 5.3 mm.

EXAMPLES

The following examples illustrate advantages of using Al-CNT conductors instead of Al conductors in wire-wound or foil-wound coils. Moreover, it is shown that the performance of coils comprising anodized Al-CNT wires or foils is competitive with coils comprising copper-based wires or foils.

The following properties are used in calculations below:
The resistivity $\rho_0$ is $1.71 \cdot 10^{-8}$ $\Omega \cdot m$ for Cu, $2.77 \cdot 10^{-8}$ $\Omega \cdot m$ for Al 1350, and $2.85 \cdot 10^{-8}$ $\Omega \cdot m$ for Al-CNT 0.5 wt. %. The coefficient of thermal resistance $\alpha$ is about 0.00393 for Cu and 0.00429 for both Al 1350 and Al-CNT 0.5 wt. %.

The thermal conductivity k of PAI is about 0.25 W/m·K, and that of an anodized Al layer (Al-Ox) is about 28-35

W/m·K. The heat transfer coefficient h of a surface to ambient air is about 12 W/K·m².

Copper magnet wires can be operated up to temperatures of about 180° C. They should be plated with nickel or silver, when operated at temperatures above 180° C. to avoid scaling and resulting degradation of the conductor. For plated copper wires the operating temperature is limited by the maximum operating temperature of the insulator, for example to 200° C. for PAI insulation.

Aluminum magnet wires such as 1350 Al wires can be operated only up to a temperature of about 150° C. consistent with an AT1 heat resistance rating. Al-CNT 0.5 wt. % magnet wires can be operated up to a temperature of 200° C. for PAI insulation, and 230° C. for Al-Ox insulation consistent with an AT4 heat resistance rating.

Example 1

Figure 5:
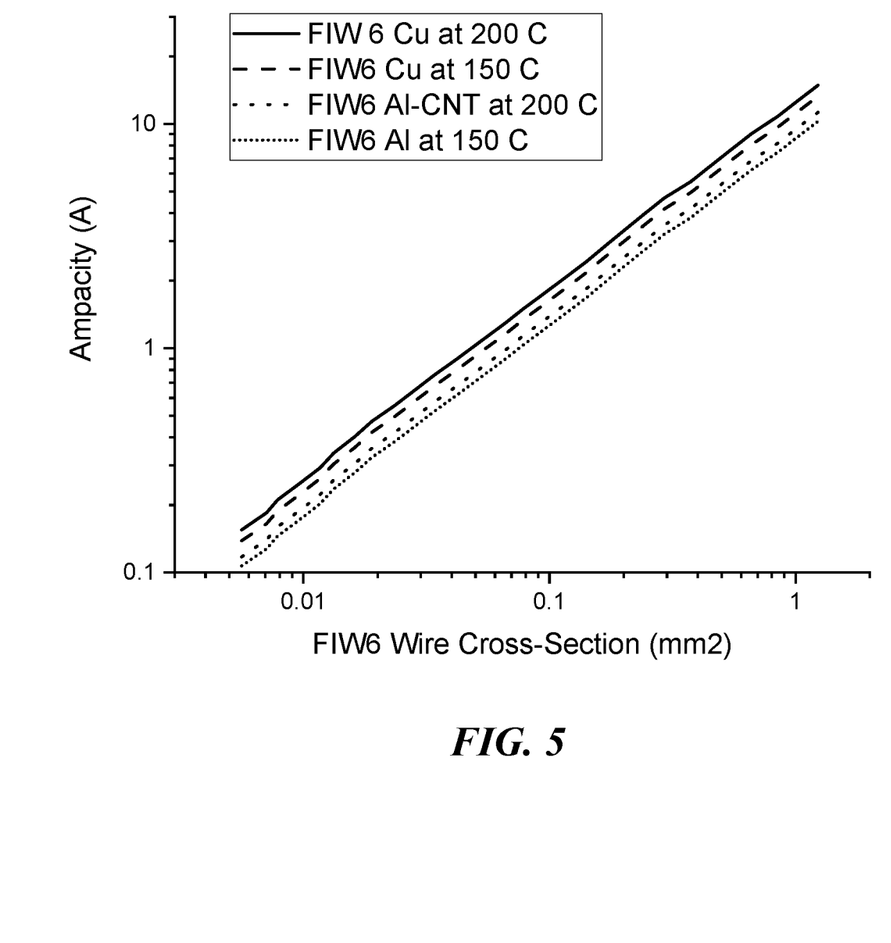
FIG. 5 is a graph that shows a maximum current in copper (Cu) and Al 1350 magnet wire with class FIW6 polyester-amide-imide (PAI) insulation.

FIG. 5 shows ampacity as a function of wire cross-section for Cu wires operating at 150° C., Ni or Ag plated Cu wires at 200° C., Al 1350 wires at 150° C., and Al-CNT 0.5 wt. % at 200° C. In these cases, a fully insulated wire of class FIW6 is assumed (for details on FIW thicknesses, see, e.g., ANSI/NEMA MW 1000-2018 standard or IEC 60317-0-7).

Compared to Cu wires, Al and Al-CNT wires have lower ampacity due to their lower conductivity and higher thermal coefficient of resistance, causing comparatively higher Joule heating. Al-CNT 0.5 wt. % wires, however, can be operated at higher current and temperature compared to Al 1350 wires due to their higher heat resistance. It therefore can readily be appreciated that Al-CNT 0.5% magnet wires are preferred over Al 1350 magnet wires when used with PAI or other high temperature insulation rated at >150° C.

Example 2

Figure 6:
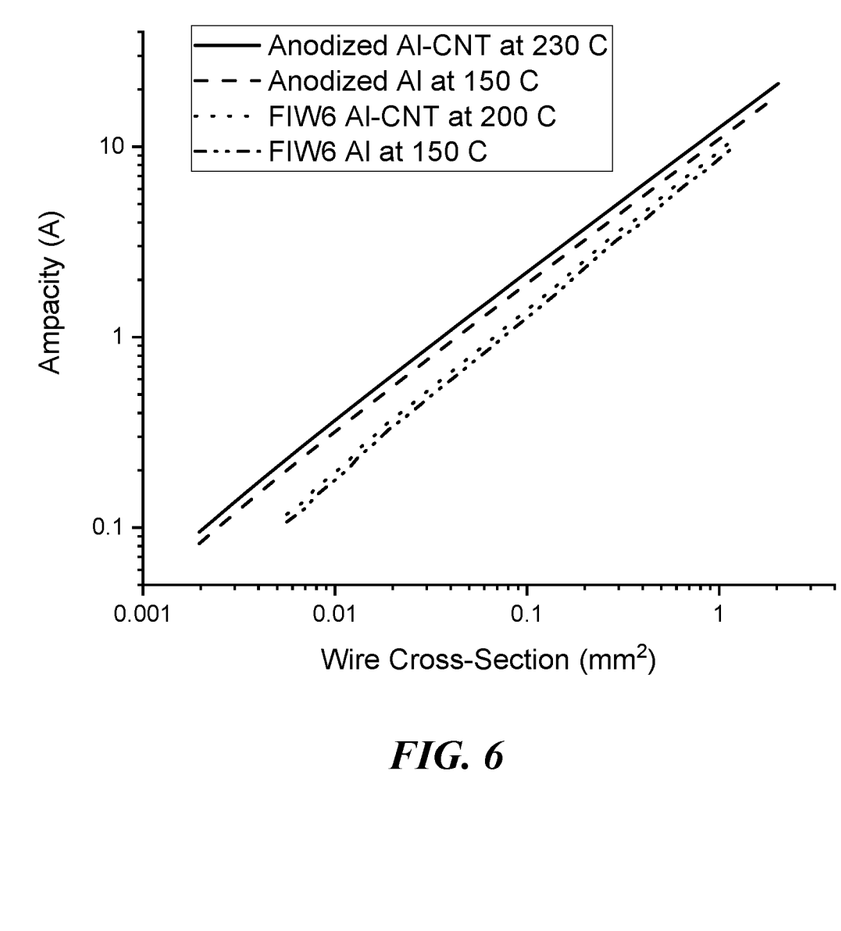
FIG. 6 is a graph that shows a maximum current in Al 1350 and Al-CNT 0.5 wt. % magnet wire with 50 μm thick FIW6 PAI insulation and Al 1350 and Al-CNT 0.5 wt. % magnet wire with a 5 μm thick aluminum oxide (Al-Ox) anodization insulation layer.

FIG. 6 shows ampacity as a function of wire cross-section for Al 1350 wires at 150° C., and Al-CNT 0.5 wt. % at 200° C. with class FIW6 PAI insulation and Al 1350 wires at 150° C. and Al-CNT 0.5 wt. % wires with a 5 μm thick surface anodization (e.g., Al-Ox).

The ampacity of anodized Al and Al-CNT wires is higher than that of the PAI class FIW6 insulated Al and Al-CNT wires, since the Al-Ox insulation is thinner and more thermally conductive than the class FIW6 PAI insulation. Therefore, it can readily be appreciated that Al and Al-CNT magnet wire with a thin anodized Al layer shows superior performance compared to Al and Al-CNT wires with a a thick PAI insulated magnet wire.

Example 3

For a coil with polymer insulated magnet wire, a filling factor can be between 0.25 to 0.65, while for an anodized Al coil the filling factor is between 0.85 to 0.995. Thus, for the same ampacity rating, Al coils with Al-Ox insulation will have a lower coil volume compared to comparable coils with thick high temperature polymer insulation.

An Al 1350 coil with a fill factor of 0.86 would be equivalent to a copper coil with a fill factor of 0.53 in terms of wire resistance considering that Al 1350 has a conductivity of 61.8% IACS. (Product of filling factor and conductivity are equal: 0.86·0.618=0.53·1). However, the weight of the Al conductor would be less than half that of the equivalent copper conductor (Ratio of the products of density and filling factor for Al and Cu: 0.86·2.7/0.53·8.96=0.49).

An Al-CNT 0.5 wt. % coil with a fill factor of 0.88 would be equivalent to a copper coil with a fill factor of 0.53 in terms of wire resistance considering that Al-CNT has a conductivity of about 60% IACS (Product of filling factor and conductivity are equal: 0.88·0.6=0.53·1). However, the weight of the Al-CNT 0.5 wt. % conductor would be only half that of the equivalent copper conductor (Ratio of the products of density and filling factor of Al-CNT and Cu: 0.88·2.7/0.53·8.96=0.50).

The Al-CNT coil can be operated up to a temperature of 230° C., the heat resistance limit of Al-CNT. By comparison, the Cu coil can be operated up to a temperature of 200° C., the temperature limit of PAI. Therefore, it can readily be appreciated that a coil with anodized Al-CNT conductor (e.g., Al-Ox insulation) is preferred over a coil with a copper conductor and high temperature insulation in terms of coil weight and operating temperature.

Example 4

Figure 7:
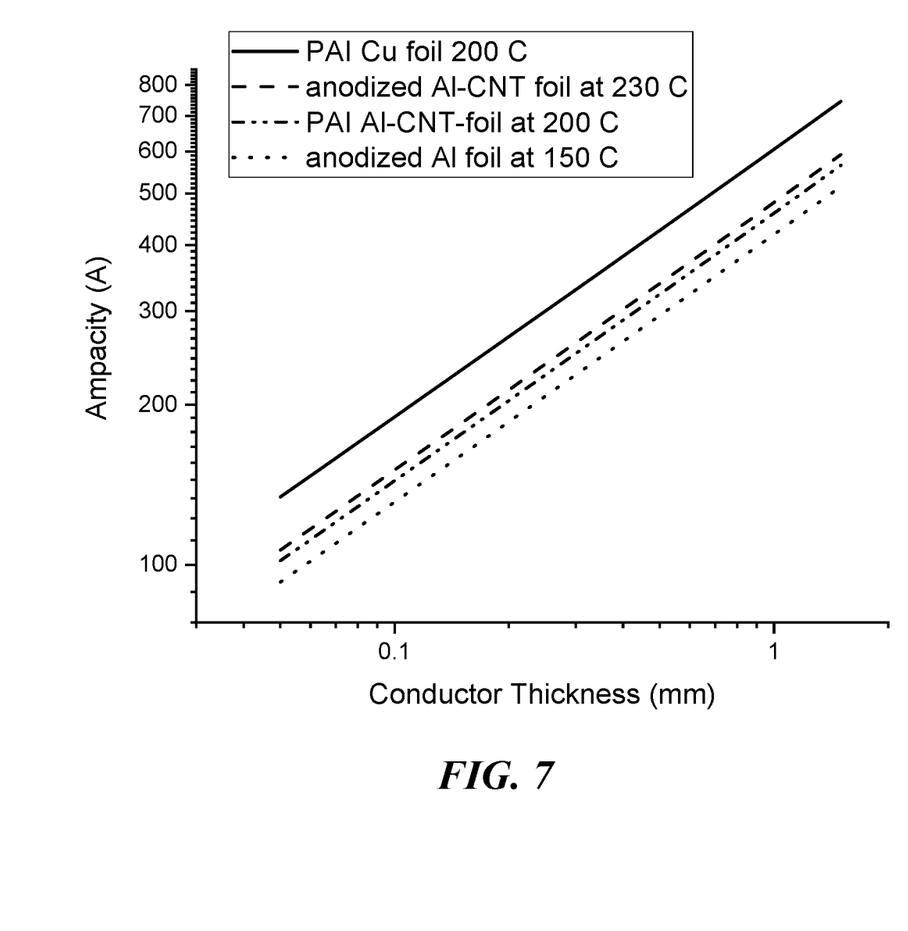
FIG. 7 is a graph that shows ampacity of 50 mm wide foils as a function of foil thickness, a Cu and Al-CNT foil with 50 μm thick PAI insulation and an Al-CNT and Al 1350 foil with 5 μm thick aluminum oxide (Al-Ox) anodization insulation layer.

FIG. 7 shows ampacity as a function of conductor thickness t for various foils of 50 mm width: Foil comprising a Ag or Ni plated Cu-foil with 50 μm thick PAI insulation operating at 200° C.; a foil comprising Al-CNT 0.5% with 50 μm thick PAI insulation operating at 200° C.; a foil comprising Al with 5 μm thick Al-Ox insulation operating at 150° C.; and a foil comprising Al-CNT 0.5 wt. % with 5 μm thick Al-Ox insulation operating at 230° C. The ampacity of the Al-Ox insulated Al-CNT foil is higher than that of the PAI insulated Al-CNT foil, which is higher than the ampacity of the Al-Ox insulated Al foil, mainly due to the respectively higher operating temperatures. The ampacity of PAI insulated copper foil is still highest in comparison to the Al and Al-CNT foils due to the higher conductivity of Cu compared to Al and Al-CNT. Therefore, it can readily be appreciated that a coil with anodized Al-CNT 0.5 wt. % is preferred over a coil with anodized Al or a coil with high temperature PAI insulated Al-CNT 0.5 wt. %.

Example 5

While preceding examples have been discussed in relation to wires or foils, the heat generated inside a tightly wound coil and the resulting temperature profiles are more complex. Most notably, convection only applies to the surface of a coil, whereas thermal conduction applies to the volume of a coil. It can be assumed that the inner part of the coil is at constant temperature.

For a foil-wound coil with air core, a foil thickness t, an inner radius $r_1$ and an outer radius $r_2$, a width b, and a filling factor f, the power dissipation is given by:

$$P = I^2 \rho \frac{\pi(r_2^2 - r_1^2)}{bt^2 f^2}, \qquad \text{Equation 5}$$

and the temperature rise is:

$$\Delta T = \frac{P}{h \cdot 2\pi(br_2 + br_1 + r_2^2 - r_1^2)}. \qquad \text{Equation 6}$$

A coil with 100 μm thick Al foil and 6.5 μm thick Al-Ox insulation (113 μm thick foil) would have a filling factor of f=0.88. The maximum operating temperature would be about 150° C.

A coil with 100 μm thick Al-CNT foil and 6.5 μm thick Al-Ox insulation (113 μm thick foil) would have a filling factor of f=0.88. The maximum operating temperature would be about 230° C.

A coil with 61 μm thick Cu foil and 26 μm thick PAI insulation (113 μm thick foil) would have a filling factor of f=0.54. The maximum operating temperature would be about 200° C.

The three coils would be about equivalent in terms of volume and resistance at room temperature as discussed in Example 3. However, the weight of the Al and Al-CNT coils would be less than half of the weight of the Cu coil considering the weight of conductor and insulator.

The foil wound coil with $r_1$=0.1 m and an outer radius of $r_2$=0.15 m would have 442 turns. For foils with a width of b=0.01 m, the ampacity of the anodized Al, Al-CNT, and PAI insulated Cu coils would be 2.7 A, 3.0 A, and 2.3 A, respectively. The induction of the coil as calculated using equation 14 in Reeves et al. "Air-cored foil-wound inductors" in Proc. IEE, Vol. 125 (1978) 460 is 54 mH.

Therefore, one can readily appreciate that while the Al-CNT coil would have the same weight as the Al coil, it would have a higher ampacity due to the higher heat resistance of Al-CNT compared to Al. One can further readily appreciate that although the Al-CNT coil with Al-Ox insulation has the same volume as the Cu coil with PAI insulation, the Al-CNT coil would weigh only about half as much as the Cu coil, but the Al-CNT coil would have about 30% higher ampacity than the Cu coil due to the higher filling factor and higher temperature rating of Al-CNT compared to Cu.

From the foregoing, it will be appreciated that specific embodiments of the invention have been described herein for purposes of illustration, but that various modifications may be made without deviating from the scope of the invention.

The invention claimed is:

1. A magnet wire configured to be wound into a coil, the magnet wire comprising:
    a conductive core consisting essentially of an aluminum metal-matrix composite (MMC) having a concentration of 0.2 to 1.5 percent by weight (wt. %) of uniformly distributed carbon nanotubes; and
    an insulating layer that coats a surface of the conductive core,
        wherein the insulating layer electrically isolates the conductive core from adjacent turns as the magnet wire is wound into the coil of a magnet, and
        wherein the magnet wire has an ultimate tensile strength of at least 200 MPa and enables tighter coil windings compared to a coil formed of an aluminum 1350 magnet wire.

2. The magnet wire of claim 1, wherein the insulated wire has substantially round cross-section.

3. The magnet wire of claim 1, wherein the insulated wire has a substantially rectangular cross-section.

4. The magnet wire of claim 1, wherein the insulated wire has a substantially two-dimensional cross section such that the width of the conductive core is substantially larger than its thickness.

5. The magnet wire of claim 4, wherein the width of the conductive core is between 10 and 1000 times larger than the thickness of the conductive core.

6. The magnet wire of claim 1, wherein the insulating layer includes a polymer.

7. The magnet wire of claim 6, wherein the polymer includes a polyester-amide-imide.

8. The magnet wire of claim 1, wherein the insulating layer is formed of anodized aluminum.

9. The magnet wire of claim 1, wherein the magnet wire is configured to form the coil of the magnet for any of:
    an electrical motor,
    an electrical generator,
    a transformer,
    an inductor, or
    a speaker.

10. The magnet wire of claim 1, wherein the magnet wire is configured to form the coil of a magnetic actuator.

11. The magnet wire of claim 1:
    wherein the magnet is an electromagnet, and
    wherein the magnet wire forms the coil of the electromagnet.

12. The magnet wire of claim 1, wherein the magnet wire has a conductivity of at least 55% IACS.

13. The magnet wire of claim 1, wherein heat resistance of the magnet wire satisfies the AT4 specification of IEC 62004.

14. A coiled wire comprising:
    a conductive core consisting essentially of aluminum and a concentration of 0.2 to 1.5 percent by weight (wt. %) of uniformly distributed carbon nanotubes; and
    an insulating mantle disposed on a surface of the conductive core,
        wherein the coiled wire is associated with a magnet, and
        wherein the coiled wire has a conductivity of at least 55% IACS, an ultimate tensile strength of at least 200 MPa, and satisfies the AT4 specification of IEC 62004, and
        wherein the coiled wire enables tighter windings compared to a coiled wire formed of aluminum without the concentration of carbon nanotubes.

15. The coiled wire of claim 14, wherein the insulating mantle includes a polymer.

16. An electrical machine comprising:
    a wire coil including a conductive core consisting essentially of aluminum with 0.2 to 1.5 percent by weight (wt. %) of uniformly distributed carbon nanotubes; and
    an insulating layer coated on a surface of the conductive core,
        wherein the insulating layer electrically isolates the conductive core from adjacent turns of the wire coil, and
        wherein the wire coil has an ultimate tensile strength of at least 200 MPa and enables tighter windings for a magnet compared to a coil wire formed of an aluminum 1350 magnet wire.

17. The electrical machine of claim 16, wherein the electrical machine includes an electrical motor or an electrical generator.

* * * * *